July 30, 1957 LE ROY R. HAWK 2,801,087
HEATER
Filed April 5, 1954 3 Sheets-Sheet 1
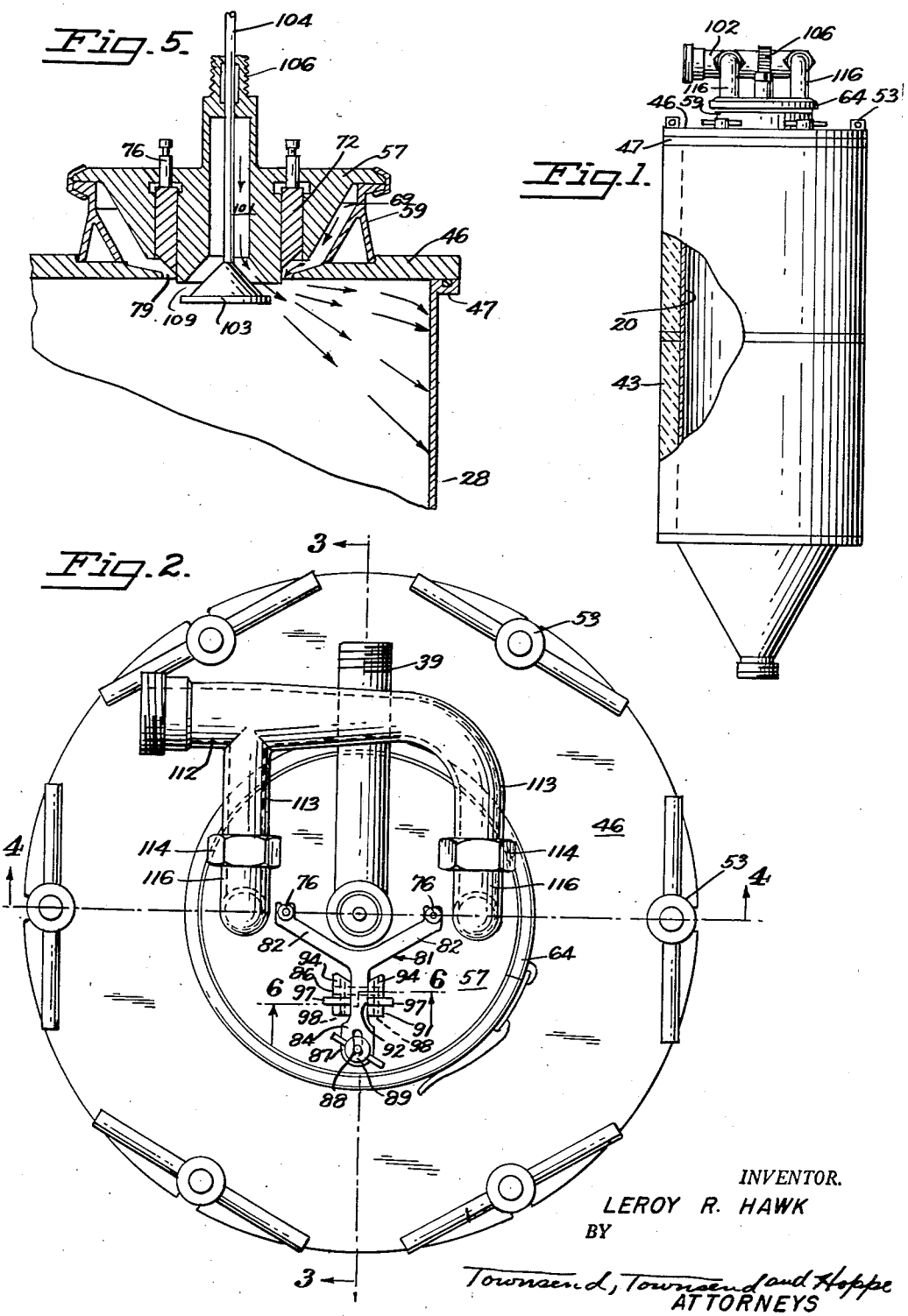
INVENTOR.
LEROY R. HAWK
BY
Townsend, Townsend and Hoppe
ATTORNEYS July 30, 1957 LE ROY R. HAWK 2,801,087
HEATER
Filed April 5, 1954 3 Sheets-Sheet 2
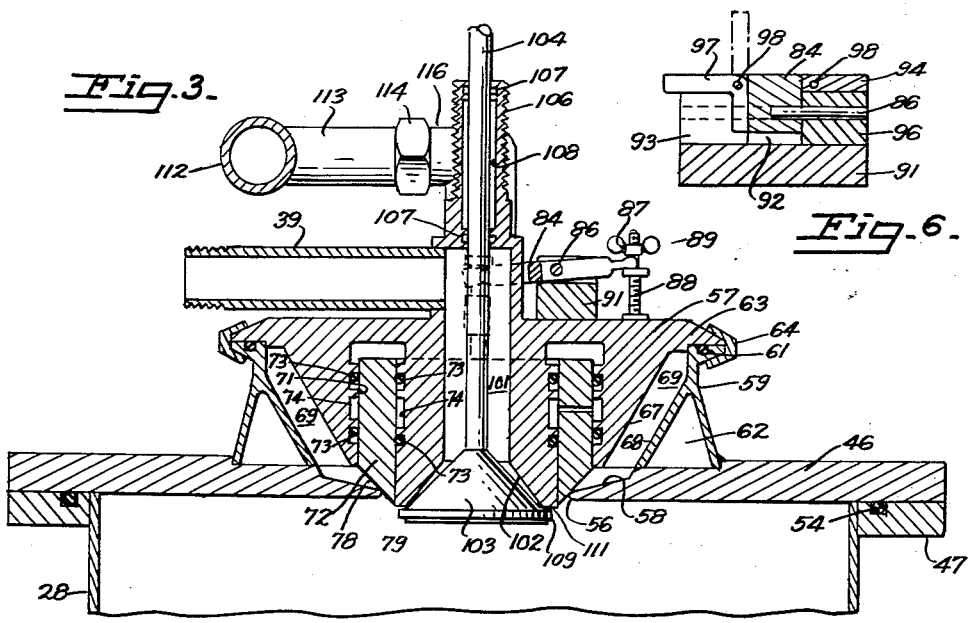
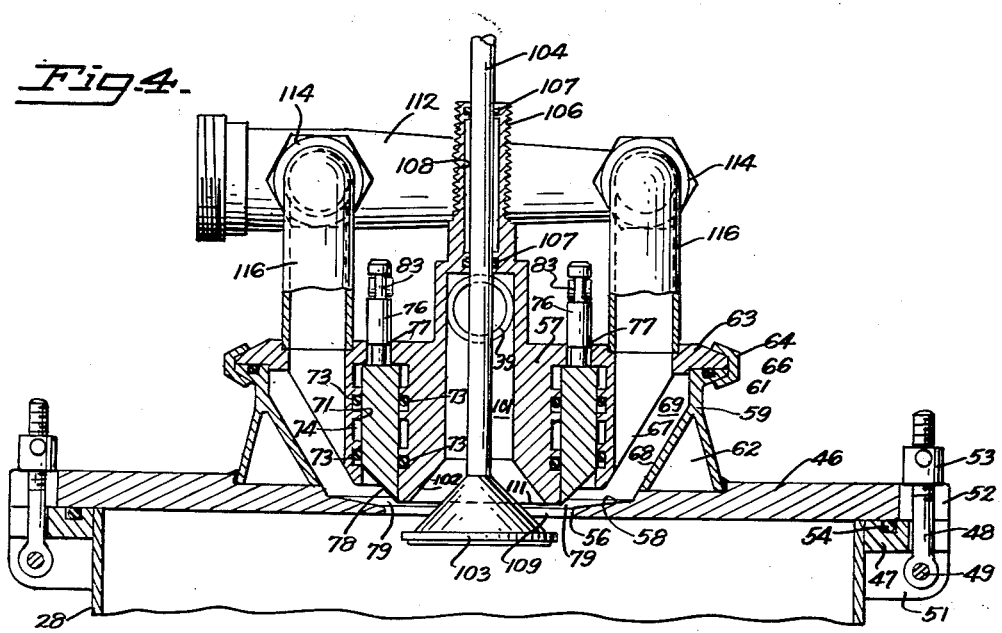
INVENTOR.
LEROY R. HAWK.
BY
Townsend, Townsend and Hoppe
ATTORNEYS

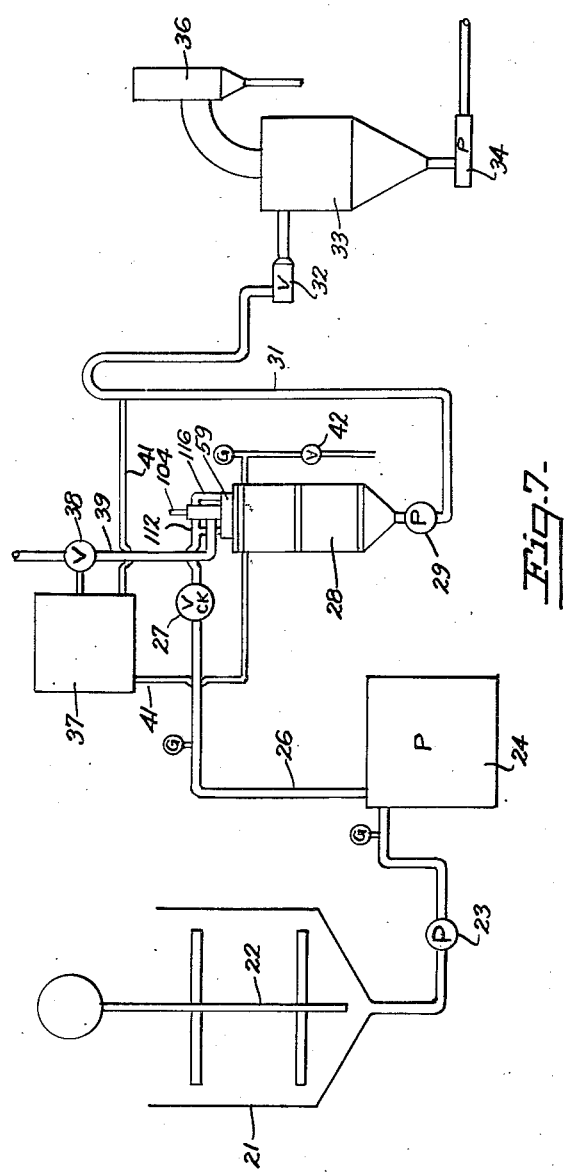

2,801,087

HEATER

Le Roy R. Hawk, San Lorenzo, Calif., assignor to Gerber Products Company, Fremont, Mich., a corporation of Michigan Application April 5, 1954, Serial No. 420,853

5 Claims. (Cl. 261—62)

This invention relates to a new and improved heater. More particularly the invention relates to a heat exchanger wherein a fluid is rapidly heated by steam and finds particular application in the processing of food products.

In other heat exchangers wherein the steam and the product are mixed together, the mechanism accomplishing this result consists either of a mechanical agitator, a thin orifice or a plate on which the product impinges. In all of these types of heat exchangers, the product is worked upon mechanically with the result that a change in particle size and consistency of the product results. It is a feature of the present invention that the steam and product are brought together in such fashion that there is a minimum of agitation of the product and the particle size of the product is not affected.

The product and steam are both at low pressure and at low velocity during the mixing with the result that there is a minimum of agitation of the product. The texture of the product, therefore, is not materially affected. In those products in which starch is an important element the starch has greater stability after heating than when other heaters are employed.

Dispersion of the product to accomplish the intimate mixture of product and steam which is necessary to bring about a rise in temperature of the character which is accomplished in this invention is accomplished by reason of the steam velocity, although this velocity, as has been stated, is quite low. The dispersion is not accomplished mechanically, as is in the case with other heaters of the agitating type, but on the contrary, the product is directed outwardly and downwardly from the center of the top of a cylindrical tank and flows down the sides of the tank, being subjected to contact with steam all the while. It will be undersood that for certain types of products an agitation during heating is desirable, particularly when there is a high protein content. The present invention finds its most ready application where agitation is undesirable, as when there is a high starch content.

In accordance with the present invention, steam and product are both introduced near the top of a cylindrical chamber, the product being gently forced out by the steam toward the walls of the chamber and dispersed uniformly on the chamber walls in a thin layer, the low velocity of the product and steam entering the chamber insuring a gentle distribution along the walls of the chamber so that agitation of the product is avoided.

One of the features of the present invention is the fact that the steam and product are introduced separately at the top of the cylindrical chamber and that the flow of steam and product can independently be adjusted. Increase in the amount of steam results in greater agitation of the product and hence in those products in which a change in consistency is desirable, the result can be accomplished by increasing the amount of steam. The independent adjustment of steam and product also makes the equipment hereinafter described adaptable to a wide variety of products and the degree of agitation of the products can be controlled or, for practical purposes, eliminated by proper regulation of the proportions of steam and product entering the processing tank.

Still another advantage and object of the present invention is the fact that deaeration can be accomplished at the same time that the product is heated. As has been stated, the product is spread out in a thin layer on the walls of the chamber and the fact that a thin layer is produced permits the escape of occluded gases such as air, oxygen, etc., the occluded gases being mixed with the steam in the chamber. A bleeder valve may be provided in the chamber which continuously bleeds off the non-condensable gases which were originally occluded in the product. It is well recognized that oxygen and other gases which may be occluded in a food product are undesirable, and hence the present invention is of particular benefit in that the deaeration and heating are accomplished simultaneously. In conventional heating equipment, in order to sterilize the processing line, when a run of product is about to commence, it is customary to substitute water for product in order to sterilize the equipment prior to the actual canning run. It is also customary in conventional heaters to switch from product to water at the termination of the run. One of the advantages of the present invention is the fact that the necessity for switching from product to water at the beginning and end of the run is eliminated. This result is accomplished by installing a pump below the heating chamber which has a capacity greater than the inlet flow of product into the chamber, thus insuring that no product will collect in the processing chamber. Furthermore, below the pump just mentioned is a valve which is set so that the discharge is at a higher pressure than the pressure in the chamber.

Other objects of the present invention will become apparent upon reading the following specification and referring to the accompanying drawings in which similar characters of reference represent corresponding parts in each of the several views.

In the drawings:

Fig. 1 is a side elevation partly broken away in section of a heating chamber incorporating the present invention.

Fig. 2 is an enlarged top plan of the structure of Fig. 1.

Fig. 3 is a partial vertical section taken substantially along the line 3—3 of Fig. 2.

Fig. 4 is a partial vertical section taken substantially along the line 4—4 of Fig. 2.

Fig. 5 is a schematic fragmentary section showing the dispersion of product and steam in the processing chamber.

Fig. 6 is a fragmentary vertical section taken substantially along the line 6—6 of Fig. 2.

Fig. 7 is a schematic view showing the flow of product in a canning process incorporating the present invention.

Turning first to the flow sheet shown in Fig. 7, the present invention may be installed in a canning food processing line illustrated therein schematically. A tank 21 is provided in which product is deposited. Agitator 22 in tank 21 agitates the product to keep it in the proper degree of suspension. Product is withdrawn from the tank by a booster feed pump 23 which supplies the product under pressure at the product metering pump 24 or homogenizer. The homogenizer 24 is important if the product being handled consists of a formulated item consisting of a mixture of various materials which are difficult to disperse and will withstand extreme agitation when the temperature is relatively low. For example, starch will withstand considerable agitation below its gelatinizing temperature (e. g. 100° F.). Thus, it is insured that the product prior to being heated is at a proper degree of dispersion. Where the agitation produced in the homogenizer 24 is undesirable by reason of the nature of the product, a different type of metering pump may be substituted. The product discharged from the homogenizer or metering pump 24 passes out through line 26 in which is installed a check valve 27 and is pumped at relatively low pressure into the heater tank 28, the details of which are hereinafter described in greater detail. Steam is injected into heater tank as hereinafter described in greater detail, an intimate mixture of the product and steam taking place in the tank which rapidly elevates the temperature of the product. Pump 29 withdraws the product from the bottom of the tank 28 and passes it through holding coil 31 where the temperature is maintained at the proper degree in order to complete processing of the product. From the holding coil 31 the product passes through a back pressure control valve 32 and thence into a cooling chamber 33 which also serves as a deaerator and discharged through the discharge pump 34 to the can filling equipment. A vapor condenser 36 in communication with the cooling chamber 33 draws off the vapor produced. An automatic temperature controller 37 is illustrated, this regulating the steam supply valve 38 in steam line 39. The automatic temperature controller 37 has contacts 41 with the interior of the heater 28 and the holding coil 31, it being desirable that the temperature of the two be identical. If the temperature in the coil 31 is below that in the heater 28, the amount of steam introduced into the heater is increased. As has heretofore been described, a bleeder valve 42 is connected to the heater tank 28 which withdraws non-condensables, including the occluded air in the product. The capacity of pump 29 is greater than the amount of product introduced into the heating chamber and back pressure valve 32 is set so that the pressure is greater than in the heater 28. Insulation 43 is provided around the outside of tank 28 to prevent condensation.

The top of the tank 28 is provided with a cover 46 which is removable. One convenient means for fastening the cover to the top flange 47 of the tank is the provision of a plurality of eye-bolts 48 which are fastened by means of pins 49 to ears 51 projecting from the side of the tank, the eye-bolts extending up through slots 52 in the cover and receiving enlarged wing-nuts 53, which upon tightening, clamp the cover to the tank flange. To seal the interior of the tank, O-rings 54 are installed in grooves in the flange, the O-rings bearing against the cover and sealing the same.

In the center of the cover 46 is a circular hole 56 through which extends a cylindrical head 57, the upper end of which is outwardly diverging to an enlarged diameter. The upper edge of the cover plate 46 surrounding the hole is recessed and bevelled at a small angle as indicated by reference numeral 58 for a reason which hereinafter appears. Welded to the cover concentric with hole 56 and spaced outwardly thereof is a hollow ring 59 triangular in cross-section with the apex upward and having a peripheral flange 61. The hollow in the ring provides a cooling chamber 62. The flange 61 is fastened to a horizontally projecting flange 63 on head 57 and sealed thereto by means of spring 64. An O-ring 66 is installed in a groove in flange 61 to seal against flange 63. The side 67 is conical and parallel to the inner surface 68 of ring 59 with a space between the ring and the tapered side of the head, which space constitutes a product inlet chamber 69.

The head 57 is formed with an annular recess 71 extending upwardly from the bottom. Within this recess is a vertically slidable product control ring 72, there being four grooves formed in the walls of the recess in which are positioned O-rings 73 which bear against the product control ring and seal the same. Optionally, ring cooling and lubricating chambers 74 may be formed by hollowing out the head. Cooling fluid is introduced into chambers 74 by any suitable means (not shown).

Two diametrically opposed pins 76 are attached to the top of product control ring 57 and project up through the top of the head 57 through holes 77. By raising and lowering the pins 76, the ring 72 may be raised and lowered. The lower edge 78 of the ring 72 is tapered at a more acute angle than the bevel 58 of the cover and hence as the ring is raised the annular orifice 79 through which product may flow from the product chamber 69 through the space between the hole 56 and the tapered edge 78 is increased and, correspondingly, as the ring is lowered, the orifice opening is decreased.

The means whereby the pins 76 are raised and lowered is subject to some variation but as shown in the accompanying drawings, a yoke 81 is provided, the arms 82 of the yoke being bifurcated to receive the necked-in portion 83 at the upper ends of the pin 76. The central stem 84 of yoke 81 is pivoted on fulcrum pin 86 and beyond the fulcrum, the end 87 of the stem is bifurcated, a threaded stud 88 fitting between the bifurcations. A wing-nut 89 on stud 88 may be used to rock the yoke around fulcrum 86, the rocking movement being transmitted to raise and lower ring 72.

A lug 91 is mounted on top of head 57 having a radially extending groove 92 in which stem 84 fits. Lug 91 is further provided with a transverse groove 93, the tops of the inner ends of which are closed off on either side of the groove 92 by reversely bent portions 94. The opposite ends of fulcrum pin 86 are received in square bearing blocks 96 which are slidable radially in grooves 93 and which in inner position fit under reversely bent portions 94. A pair of L-shaped detents 97 is further provided which are disposed in transverse groove 93 and are pivoted on pins 98 passing through their midpoints and fixed in lugs 91. When detents 97 are in the position shown in full lines in Fig. 6, they prevent rearward movement of blocks 96 in grooves 93. Where detents are pivoted to dot-and-dash position they leave room for blocks 96 to be slid radially outwardly a sufficient distance so that ends 82 of yoke 81 disengage pins 76, permitting ring 72 to be removed from recess 71.

The center of the head 57 is hollowed out in a bore formed in the center of the head from the underside thereof, the bore constituting a steam chamber 101. The center of the lower end of the head is counter-sunk as indicated by reference numeral 102. A steam disk 103 shaped like a poppet valve is positioned in the counter-sunk portion of the head, the stem 104 of the disk extending up through an upward extension 106 at the top of the head 57. O-rings 107 installed in grooves in the inner bore in the upward extension bear against the stem 104 and seal the same. Optionally, a stem cooling and lubricating chamber 108 may be formed between the O-rings, a suitable connection being made for cooling fluid. As the stem 104 is raised and lowered, by a conventional valve stem lifting means (not shown), the annular orifice 109 between the steam disk 103 and the lower edge 111 of the head 57 is increased and decreased, and this, in turn, regulates the flow of steam through the orifice 109.

Product passing from check valve 27 is received in product manifold 112 extending horizontally above the head 57 and to one side of the central axis thereof. As shown in the accompanying drawings, two offshoots 113 from the manifold are connected by means of unions 114 to elbows 116, the lower ends of which are connected into the product inlet chamber 69. The product in the product inlet chamber 69 flows out through the ring orifice 79 between the bottom edge 78 of the product-adjusting ring 72 and the edge of the central hole 56 in the cover 46 and the amount of flow is regulated by raising and lowering of the ring 72 as heretofore described.

The steam enters the steam inlet chamber 101 through pipe 117. When the heater is in operation, the steam passing from steam inlet chamber 101 through orifice 109 is directed outwardly toward the walls of the chamber. In its outward passage it meets the product which is directed inwardly at an angle with respect to the path of the steam, the product being dispersed outwardly by the steam as shown by the arrows in Fig. 5. The steam is preferably super heated and at low velocity and the product entering the chamber 69 is likewise at low velocity. Accordingly, the direction assumed by the product, is, as shown by the arrows in Fig. 6, in an outwardly divering path which spreads the product more or less uniformly over the inner surface of the tank 28 in a thin film. The mixture of the steam and product is thus intimate and the super-heat of the steam is utilized to raise the temperature of the product almost instantaneously to the desired degree. By reason of the fact that the film on the walls of the chamber 28 is very thin, the occluded gases escape and the non-condensable gases are drawn out of the chamber through continuous bleeder valve 42.

It will be noted that the dispersion of the product results in an atomization thereof, and, at the same time, the fine dispersion of the product is accomplished without mechanical action, without forcing the product through fine orifice plates, and without impinging the product with any considerable velocity on a plate or other stationary surface.

Although I have described my invention in some detail by way of illustration and example for purposes of clarity of understanding, it is understood that certain changes and modifications may be practiced within the spirit of the invention and scope of the appended claims.

What is claimed is:

1. A heater for liquiform product comprising a tank, a top on said tank, said top being centrally apertured, a head on said top in registry with the aperture in said top with an annular space between the margin of said aperture and said head, said head being formed with a central steam chamber, means for supplying steam to said steam chamber, a valve at the end of said steam chamber proximate said tank, means for moving said valve to regulate discharge of steam from said steam chamber into said tank, said valve and the complementary portion of said head being outwardly flared to direct steam outwardly toward the sides of said tank, means surrounding said head and forming a product inlet chamber, means for supplying liquiform product to said product inlet chamber, a control ring in said head movable toward and away from said top to vary the opening of said annular space to control discharge of product from said product inlet chamber into said tank, means for moving said ring, said annular space being located adjacent said valve, and means for withdrawing heated product from said tank.

2. A heater according to claim 1 in which said valve and head are shaped to direct steam outwardly and said head and top are shaped to direct product inwardly into the stream of steam discharged from said steam chamber and thence outwardly to the sides of said tank.

3. A heater according to claim 1 in which the top of said head is formed in at least one aperture and said ring is provided with at least one extension projecting through said aperture and exteriorly of said head which further comprises means for elevating and depressing said extension and said ring.

4. A heater according to claim 3 in which said last-named means comprises a lever, a fulcrum for said lever mounted on said head, and adjustment means, one end of said lever engaging said extension and the other end of said lever engaging said adjustment means.

5. A heater according to claim 4 in which said fulcrum is movable on said head and in which in retracted position said extension is disengaged to permit withdrawal of said ring from said head and which further comprises latch means for latching said fulcrum against retraction.

References Cited in the file of this patent

UNITED STATES PATENTS

| | | |
|---|---|---|
| 996,832 | Campbell | July 4, 1911 |
| 1,141,242 | Fenn | June 1, 1915 |
| 1,193,173 | Merrel et al. | Aug. 1, 1916 |
| 2,384,998 | Haugh | Sept. 18, 1945 |